United States Patent
Dittes

(10) Patent No.: US 10,808,812 B2
(45) Date of Patent: Oct. 20, 2020

(54) SPINDLE DRIVE HAVING A HOUSING, A SPINDLE, AND A SPINDLE NUT THAT IS OPERATIVELY CONNECTED TO THE SPINDLE

(71) Applicant: SEW-EURODRIVE GMBH & CO. KG, Bruchsal (DE)

(72) Inventor: Gerhard Dittes, Gondelsheim (DE)

(73) Assignee: SEW-EURODRIVE GMBH & CO. KG (DE)

( * ) Notice: Subject to any disclaimer, the term of this patent is extended or adjusted under 35 U.S.C. 154(b) by 374 days.

(21) Appl. No.: 15/538,522

(22) PCT Filed: Nov. 18, 2015

(86) PCT No.: PCT/EP2015/002310
§ 371 (c)(1),
(2) Date: Jun. 21, 2017

(87) PCT Pub. No.: WO2016/102036
PCT Pub. Date: Jun. 30, 2016

(65) Prior Publication Data
US 2017/0350478 A1    Dec. 7, 2017

(30) Foreign Application Priority Data

Dec. 22, 2014  (DE) .......................... 10 2014 018 919
Jan. 20, 2015  (DE) .......................... 10 2015 000 358

(51) Int. Cl.
*F16H 57/04*    (2010.01)
*F16H 25/20*    (2006.01)

(52) U.S. Cl.
CPC ..... *F16H 25/2015* (2013.01); *F16H 57/0497* (2013.01); *F16H 2025/204* (2013.01)

(58) Field of Classification Search
CPC ...... F16H 25/20; F16H 25/24; F16H 25/2021; F16H 25/2015; F16H 25/2003
(Continued)

(56) References Cited

U.S. PATENT DOCUMENTS 2,631,709 A * 3/1953 Anderson ................ G05G 5/04
                                                 192/141
2007/0062317 A1   3/2007 Nagai et al.
(Continued)

FOREIGN PATENT DOCUMENTS

CN    104132092 A    11/2014
CN    203926710 U    11/2014
(Continued)

OTHER PUBLICATIONS

International Preliminary Report on Patentability issued in international patent application No. PCT/EP2015/002310, dated Jun. 27, 2017 (7 pages total).
(Continued)

*Primary Examiner* — William Kelleher
*Assistant Examiner* — Randell J Krug
(74) *Attorney, Agent, or Firm* — Carter, DeLuca & Farrell LLP

(57) ABSTRACT

A spindle drive includes a housing, a spindle, e.g., a threaded spindle, a trapezoidal threaded spindle, a ball circulation spindle or planetary roller spindle, and a spindle nut that is operatively connected to the spindle. The spindle nut is guided on the housing in a manner that allows it to be moved back and forth in response to rotational movement of the spindle in the axial direction thereof. On at least one axial side, the spindle nut includes an annular groove or is connected, e.g., screw-connected, to a part that has an annular groove. An annular collar is formed on the housing. The collar enters or extends into the annular groove in
(Continued)

response to the spindle nut reaching an associated or a corresponding axial position.

18 Claims, 9 Drawing Sheets

(58) Field of Classification Search
USPC .......... 74/89.37, 89.39, 89.32, 89.33, 89.42, 74/89.23
See application file for complete search history.

(56) References Cited

U.S. PATENT DOCUMENTS

| | | | |
|---|---|---|---|
| 2012/0227522 A1* | 9/2012 | Wu | F16H 25/2454 74/89.14 |
| 2016/0153477 A1* | 6/2016 | Van Mil | F16H 25/2021 92/68 |

FOREIGN PATENT DOCUMENTS

| | | |
|---|---|---|
| DE | 202006003130 U1 | 7/2006 |
| DE | 102006043599 A1 | 4/2007 |
| DE | 202009013875 U1 | 12/2009 |
| EP | 2194295 A1 | 6/2010 |
| GB | 881194 A * | 11/1961 |
| WO | 2006089554 A1 | 8/2006 |

OTHER PUBLICATIONS

International Search Report dated Apr. 8, 2016, in International Application No. PCT/EP2015/002310. (English-language translation).

* cited by examiner

SPINDLE DRIVE HAVING A HOUSING, A SPINDLE, AND A SPINDLE NUT THAT IS OPERATIVELY CONNECTED TO THE SPINDLE

FIELD OF THE INVENTION

The present invention relates to a spindle drive having a housing, a spindle, and a spindle nut that is operatively connected to the spindle.

BACKGROUND INFORMATION

In the case of a spindle drive, it is generally known that the spindle nut can be moved back and forth along the axis of a spindle that engages therewith.

SUMMARY

Example embodiments of the present invention provide an improved design for a spindle drive, it being possible to prevent a hard striking against the axial end positions of the spindle nut.

According to an example embodiment of the present invention, a spindle drive includes a housing, a spindle, e.g., a threaded spindle, a trapezoidal threaded spindle, a ball circulation spindle or planetary roller spindle, and a spindle nut that is operatively connected to the spindle. The spindle nut is guided on the housing in a manner that allows it to be moved back and forth in response to rotational movement of the spindle in the axial direction thereof. On at least one axial side, the spindle nut includes an annular groove or is connected, in particular screw-connected to a part that has an annular groove. An annular collar is formed on the housing. The collar enters or extends into the annular groove in response to the spindle nut reaching an associated or a corresponding axial position.

A hard striking of the spindle nut against the two axial end positions is thereby prevented because the medium contained in the annular groove is compressed, thus braking the impact. The medium is either air, oil or an oil-air mixture.

According to an example embodiment of the present invention, a spindle drive includes a housing, a spindle, e.g., a threaded spindle, a trapezoidal threaded spindle, a ball circulation spindle or planetary roller spindle, and a spindle nut that is operatively connected to the spindle. The spindle nut is guided on the housing in a manner that allows it to be moved back and forth in response to rotational movement of the spindle in the axial direction thereof. Axially on each of the two sides, the spindle nut includes an annular groove or being connected, e.g., screw-connected to a respective part that has an annular groove in each case. An annular collar is formed on the housing in each case. The respective collar enters or extends into the respective annular groove in response to the spindle nut reaching a respective, associated or corresponding axial position.

A hard striking of the spindle nut against the two axial end positions is prevented because the medium contained in the annular groove is compressed, thus braking the impact. The medium is either air, oil or an oil-air mixture.

A gap may be provided between the annular groove and the associated collar for the purpose of the respective collar entering or extending into the respective annular groove, in particular in response to the spindle nut reaching a respective, associated or corresponding axial position. It is thereby advantageous that the gap is sealed by oil. Following the compression, the compressed medium flows out through the gap, and the pressure is thus reduced.

The gap may be covered with oil, thereby preventing a hard striking of the spindle nut against the axial end positions.

The gap between the annular collar and the annular groove may be at least partially filled with oil. It is thereby advantageous that the annular groove is at least partially filled, or at least the gap is covered with oil and is thus sealed.

A first annular groove may be formed on an intermediate ring that is connected, e.g., screw-connected to the spindle nut, in particular, that is screw-connected to the spindle nut by at least one screw that radially traverses the intermediate ring; the screw being screwed into a radially directed threaded hole of the spindle nut. It is thereby advantageous that the annular groove communicates with the spindle nut, the annular axis being oriented parallel to the direction of movement of the spindle nut.

A second annular groove may be formed on a ring part that is screw-connected to a piston rod. For this purpose, for example, the ring part having an internal thread, and the piston rod an external thread. Connecting screws axially traversing an annular collar are screwed into a respective, axially directed threaded hole of the ring part, the annular collar projecting radially on the spindle nut. For example, the screw heads of the connecting screws engage on the annular collar side that faces away from the ring part and projects radially on the spindle nut. The intermediate ring includes circumferentially, mutually spaced apart recesses into each of which a screw head projects. It is thereby advantageous that an annular groove communicates axially with the spindle nut on both sides, the annular groove being provided in each case in a part that is connected to the spindle nut. Therefore, there is no need to introduce a groove into the spindle nut.

The piston rod may be supported on the housing by a slide bearing. It is thereby advantageous that a very large axial extension of the piston rod and thus a very large travel range are made possible.

Sliding blocks, e.g., plastic sliding blocks, are screw-connected to the ring part and guided in a groove provided on the housing. It is thereby advantageous that negligible friction losses are associated with the sliding blocks since the soft plastic of the sliding blocks makes it easy to implement a slide bearing that is disposed toward the housing.

The housing may be made of metallic housing parts. It is thereby advantageous that the spindle drive withstands a high load.

Further features and aspects of example embodiments of the present invention are explained in greater detail below with reference to the appended Figures.

DETAILED DESCRIPTION

Figure 1:
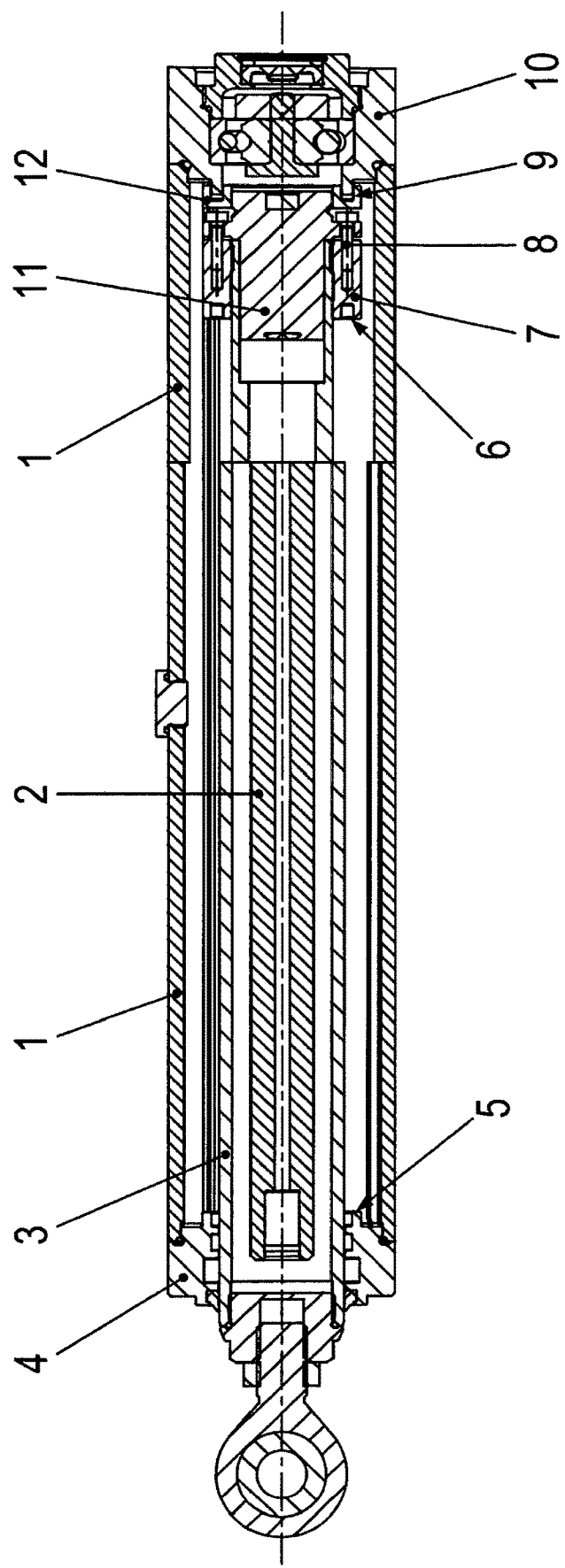
FIG. 1 shows a linear drive, e.g., a spindle drive, according to an example embodiment of the present invention in a sectional view.

As shown in the Figures, the spindle drive has a housing part 1 that is connected at the driven end to a housing part 4 and, at the drive end, to a housing part 10, e.g., a bearing flange, in which a bearing 43 is accommodated that supports spindle 2 of the spindle drive.

Spindle 2 is connected via a coupling to a rotor shaft of an electric motor. The rotor shaft is rotationally mounted in a housing of the electric motor, the housing being screw-connected to housing part 10.

Thus, the electric motor is able to set spindle 2 into rotary motion. Spindle 2 has an external thread and/or is arranged as a ball circulation spindle, a trapezoidal threaded spindle, or as a planetary roller spindle.

A spindle nut 11 features an internal thread that engages with the external thread of spindle 2. Spindle nut 11 is guided in housing part 1 linearly, e.g., axially, thus in the direction parallel to the axial direction of the electric motor's rotor shaft. For this purpose, housing part 1 has guide grooves in which sliding blocks, e.g., plastic sliding blocks are accommodated; the sliding blocks are coupled to spindle nut 11 or to a part that is fixedly coupled thereto.

Thus, in response to the rotor shaft being set into rotary motion, spindle 2 co-rotates, and spindle nut 11 is, therefore, linearly displaced, e.g., in the axial direction.

A piston rod 3, which is supported in housing part 4 by a slide bearing 42, is secured to spindle nut 11. Moreover, a scraper 41, as well as a seal 40, which is arranged axially between scraper 41 and slide bearing 42, are disposed between piston rod 3 and housing part 4.

A ring part 7 is screw-connected to spindle nut 11 by axially oriented connecting screws 8. The screw heads of connecting screws 8 are configured at the end region of connecting screws 8 facing the electric motor.

Ring part 7 has an annular groove 6, whose annular axis is oriented coaxially to the axis of spindle 2 or to the rotor shaft of the electric motor. Thus, the annular groove is open to the side of the electric motor that faces away from the electric motor.

In the same manner, an intermediate ring 12 is joined to spindle nut 11 on the side of spindle nut 11 facing the motor. Intermediate ring 12 thereby covers the screw heads of connecting screws 8. For this, intermediate ring 12 features axially directed recesses 50 into which the screw heads project. Intermediate ring 12, which is torsionally fixed to the spindle nut, features an annular groove 9 that opens toward the motor.

Upon approaching the motor-side axial end position, an annular collar formed on housing part 10 enters into annular groove 9.

Intermediate ring 12 is connected by at least one radially traversing screw 44, e.g., a setscrew, to spindle nut 11.

Recesses 50 are mutually spaced apart circumferentially, e.g., evenly spaced apart from one another. Thus, recesses 50 are arranged on the side of intermediate ring 12 facing spindle nut 11. Annular groove 9 is located on the side of intermediate ring 12 facing away from spindle nut 11.

Thus, along with spindle nut 11, on the side thereof facing axially away from the motor, an annular groove 6 and, on the side thereof axially facing the motor, an annular groove 9 are provided.

At the axial end positions, e.g., at the axial position that is the furthest from the motor, and at the axial position that is the most proximate possible to the motor, a hard striking of spindle nut 11 and of the parts connected thereto against respective housing part (4, 10) is prevented, in that the respective annular collar formed on respective housing part (4, 10) dips into corresponding annular groove (6, 9).

As illustrated in FIG. 2a, 2b, 2c, 2d, a quantity of oil or an oil-air mixture is contained in the respective annular groove (6, 9) before the respective annular collar makes impact. This compresses the quantity or the mixture, thereby braking the movement of spindle nut 11 in response to the respective collar entering into respective annular groove (6, 9). This dampening may be achieved very effectively when the associated gap between the collar and corresponding annular groove (6, 9) has a small width. However, it is possible to prevent any direct contacting of the metallic parts, e.g., of the collar and the inner wall of annular groove (6, 9).

Figure 2A:
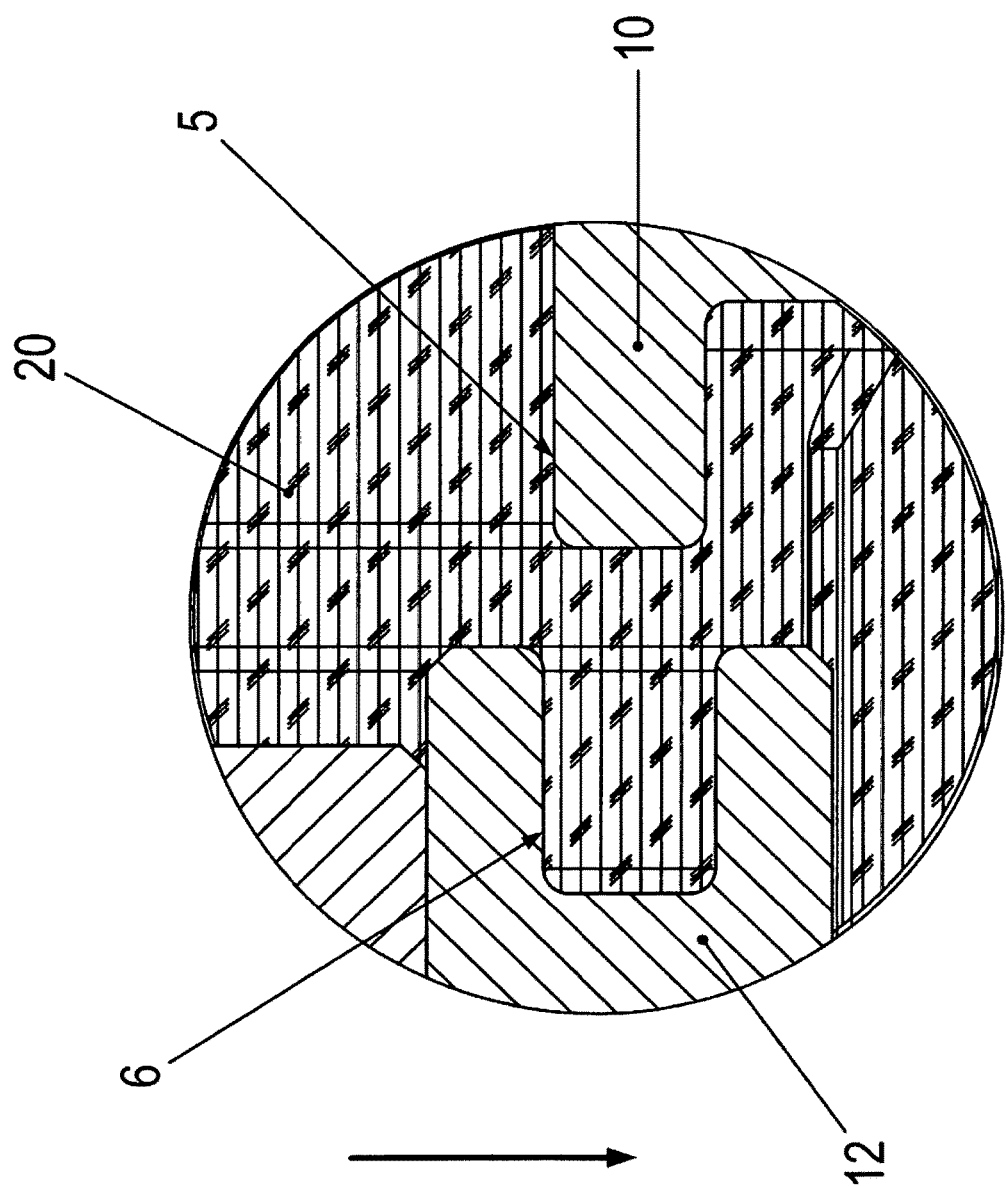
FIG. 2a shows an enlarged detail in a first orientation in the gravitational field.

As shown in FIG. 2a, annular groove 6 of intermediate ring 12 is completely below the oil level in the interior of the spindle drive, at least in the lower region thereof in the direction of gravity, e.g., in the arrow direction drawn in FIG. 2a. Thus, the region drawn in FIG. 2a is immersed in oil 20. The portion of annular groove 6 that projects above the oil level is filled with air. In response to collar 5 entering into annular groove 6, oil 20, which is less compressible than air, is pressed upwardly, and the air content of the oil-air mixture formed in annular groove 6 is compressed. In the mounting position in FIG. 2a, e.g., in the installed position of the spindle drive, the axial direction is oriented transversely to the direction of gravity. Therefore, spindle nut 11 also moves in this direction, e.g., transversely to the direction of gravity. The gap between collar 5 and annular groove 6 is also slightly filled with oil. The sealing oil contained in the gap impedes the escape of the compressed oil-air mixture.

Figure 2B:
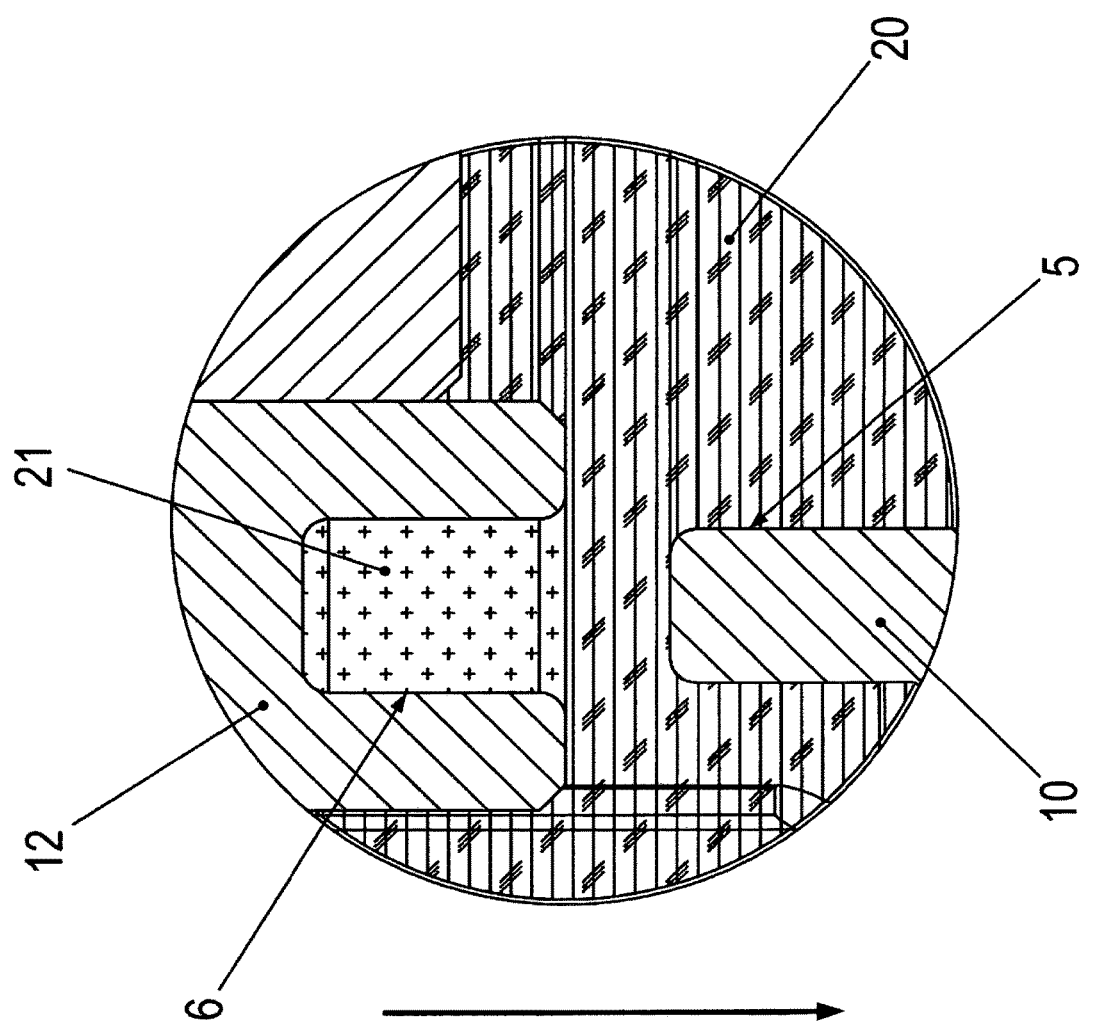
FIG. 2b shows an enlarged detail in a second orientation in the gravitational field.

As shown in FIG. 2b, the axial direction is oriented orthogonally to the direction of gravity. Thus, annular groove 6 is filled with air 21, e.g., completely with air 21 in response to the spindle nut entering into the oil bath from above. Thus, collar 5 moves out of the oil bath to enter into annular groove 21 filled with air 21. The gap between collar 5 and annular groove 6 is also sealed by oil. The sealing oil contained in the gap impedes the escape of the compressed oil-air mixture.

Figure 2C:
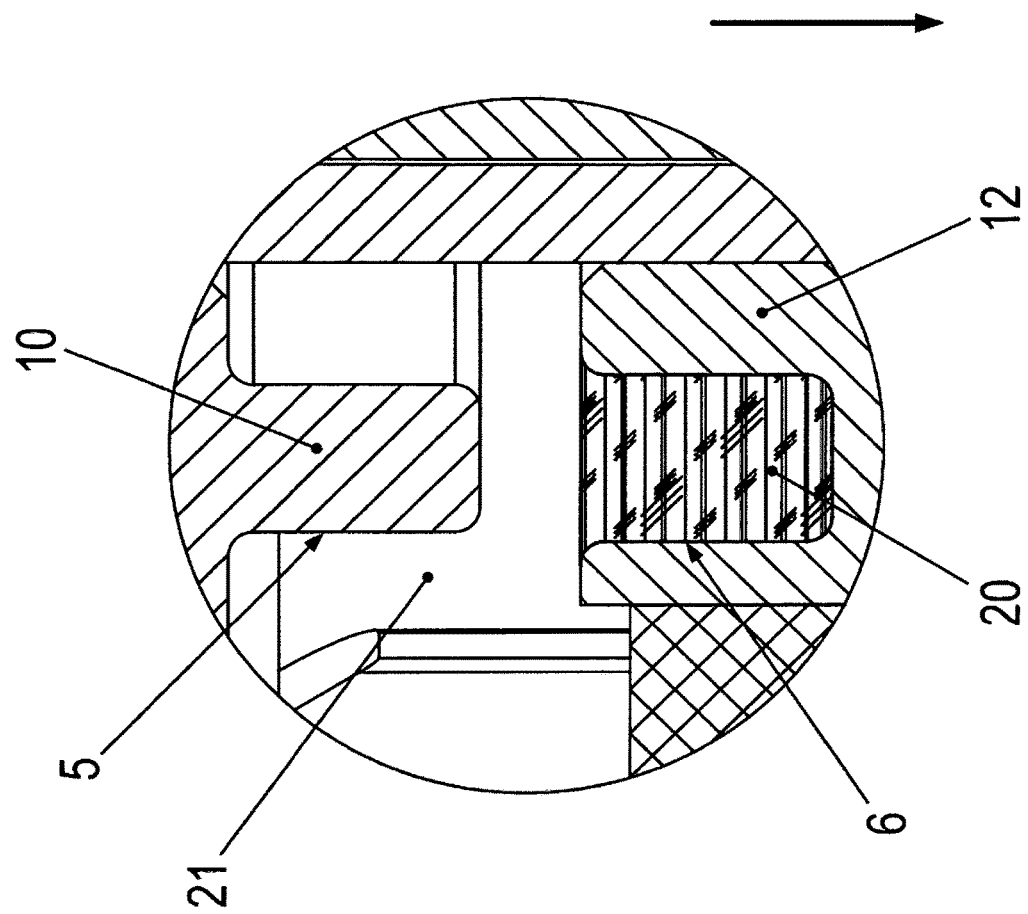
FIG. 2c shows an enlarged detail in a third orientation in the gravitational field.

As shown in FIG. 2c, upon moving out of the oil bath, annular groove 6 is filled with oil 20. Upon entering into annular groove 6, collar 5 displaces oil 20. However, oil 20 is only able to flow with difficulty out of the compressed volume through the gap between collar 5 and the inner groove wall.

Figure 2D:
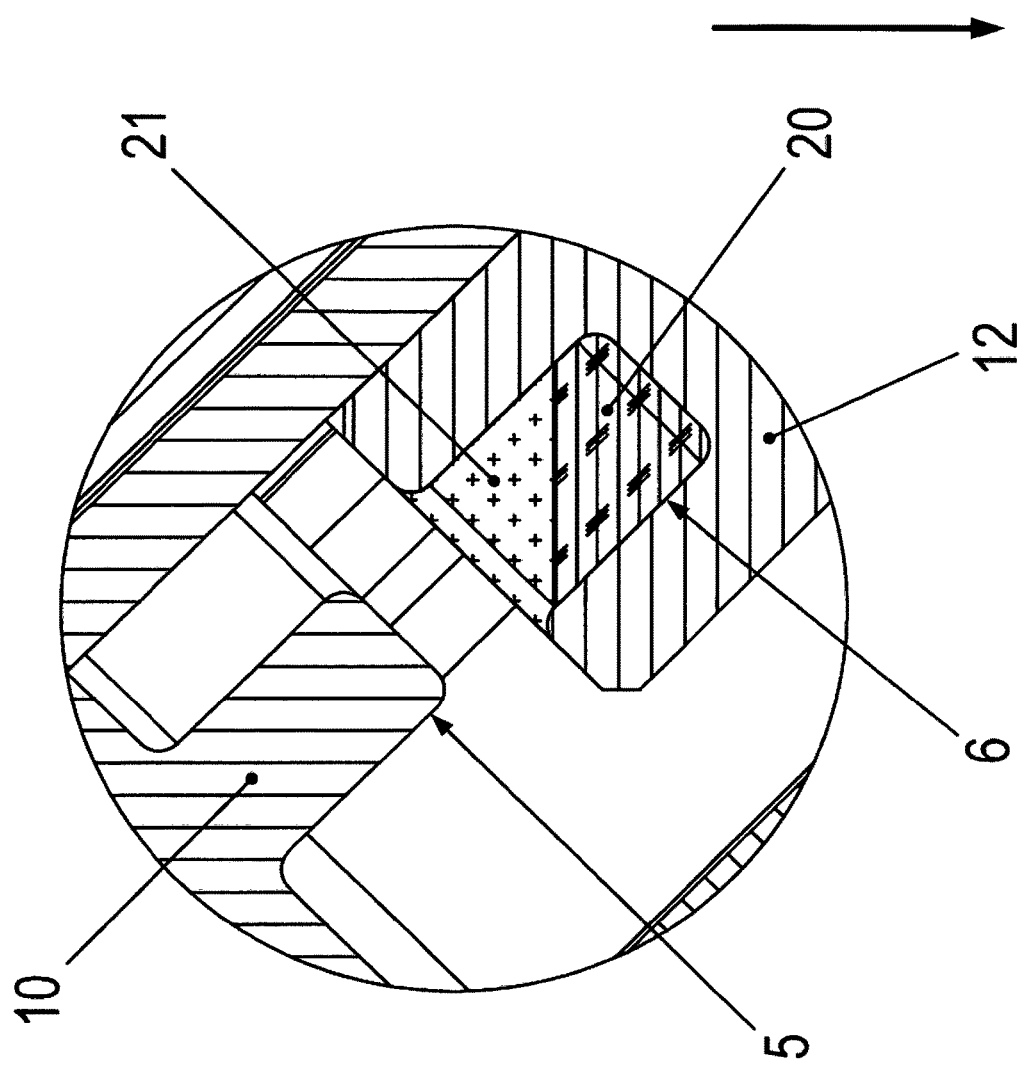
FIG. 2d shows an enlarged detail in a fourth orientation in the gravitational field.

FIG. 2d illustrates the spindle drive orientation angled to the direction of gravity; the axial direction has an angle of between 0° and 90°, for example, an angle of 45°. As illustrated in FIG. 2d, a portion of the bottom part of annular groove 6 is filled with oil 20.

Thus, in the spindle drive orientations shown in FIG. 2a, 2b, 2c, 2d, oil, air and/or an oil-air mixture are compressed, and thus spindle drive 11 is braked.

Since an annular groove is axially arranged on both sides of spindle drive 11, the respective corresponding collar of housing part 4 or 10 may perform the aforementioned braking axially on both sides.

The spindle drive also has the advantage that, once the respective collar enters into the respective annular groove, the pressure built up in the annular groove is reduced by the compressed medium flowing out through the gap. Thus, a simple removal is made possible without having to overcome an immobilization of the spindle drive. This is because, without the braking, spindle nut 11 is driven to stop against the housing part, again resulting in a distortion between the internal thread of spindle nut 11 and the external thread of spindle 2, that leads to a self-locking to be overcome later upon starting.

Figure 4:
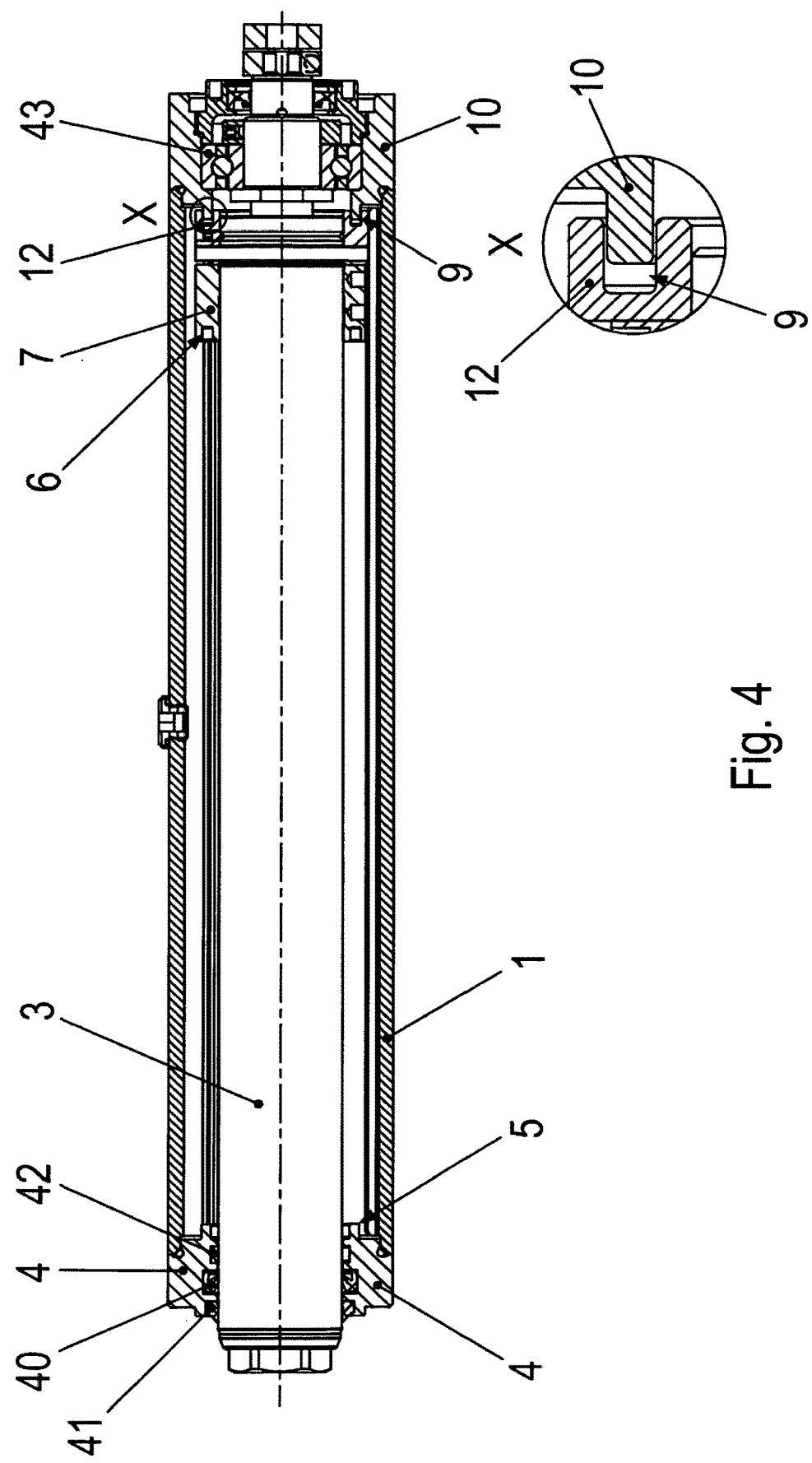
FIG. 4 shows a linear drive according to an example embodiment of the present invention, e.g., a spindle drive, in a sectional view.
Figure 5:
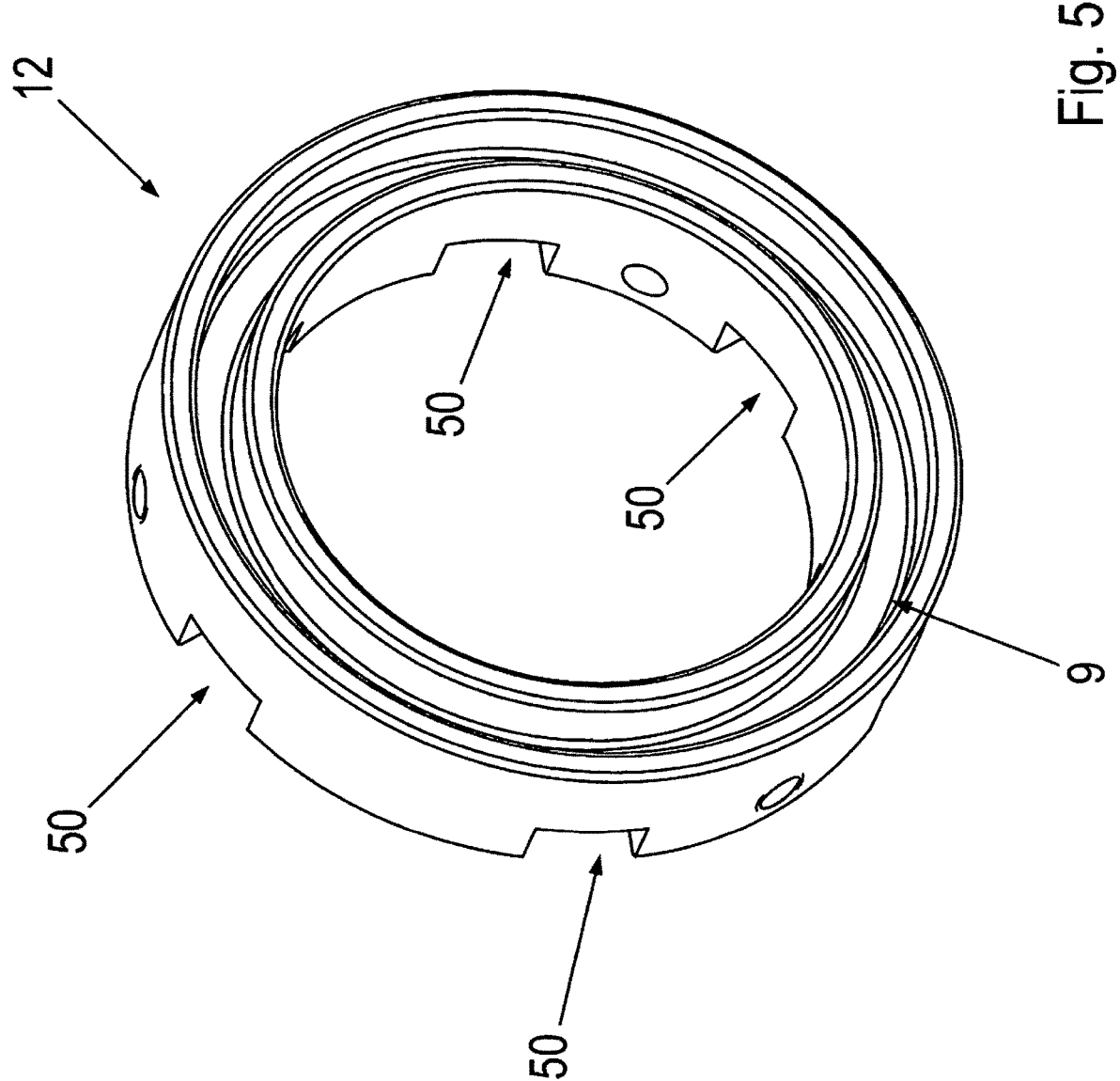
FIG. 5 shows an intermediate ring 12 used in FIG. 1 in an oblique view in a first direction of view.
Figure 6:
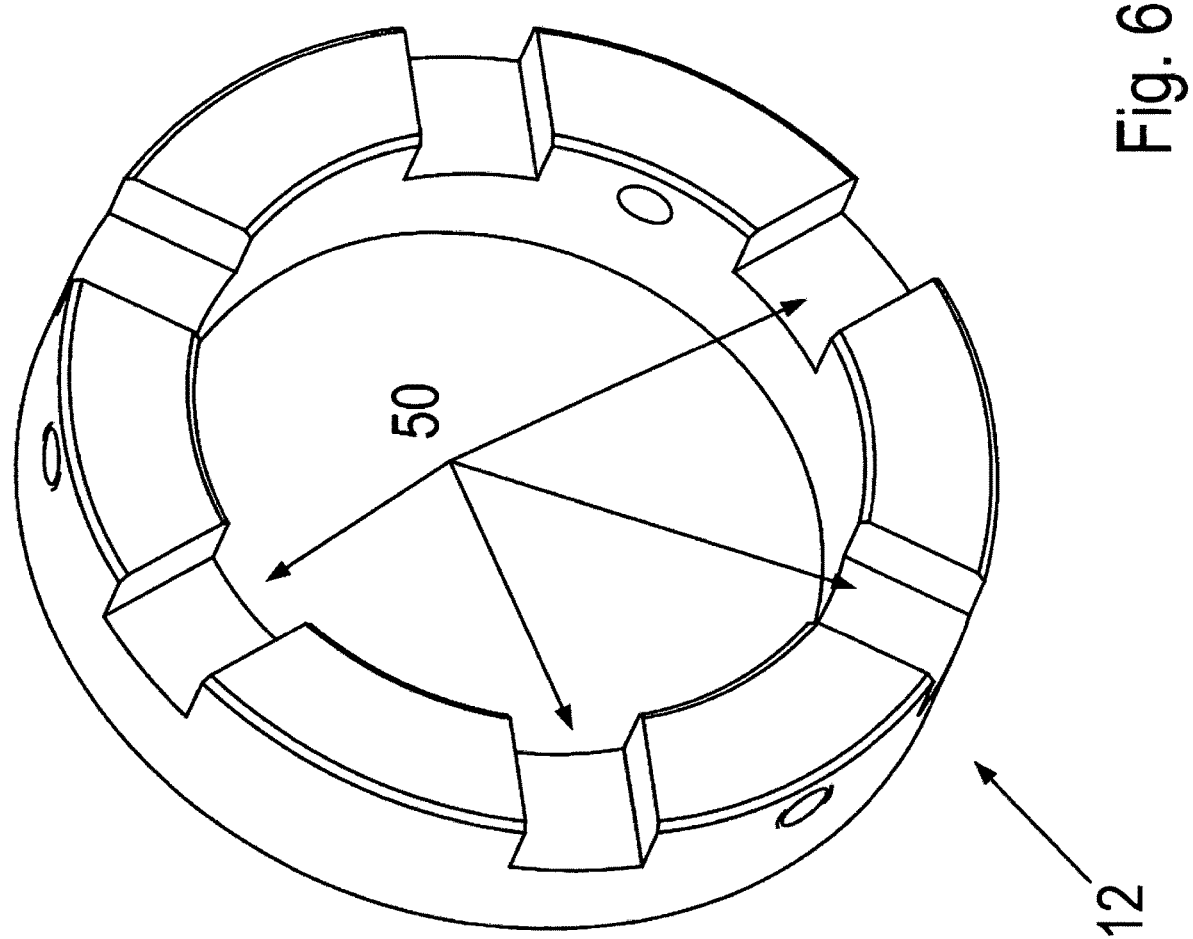
In FIG. 6, intermediate ring 12 is shown in an oblique view in another direction of view.

As shown in FIG. 4, a first annular groove 9 is formed on intermediate ring 12 that is connected, e.g., screw-connected to spindle nut 11; intermediate ring 12 is screw-connected to spindle nut 11 by at least one screw that radially traverses intermediate ring 12; the screw being screwed into a radially directed threaded hole of the spindle nut.

A second annular groove 6 is formed on ring part 7 that is screw-connected to piston rod 3; for this purpose, ring part 7 includes an internal thread and piston rod 3 an external thread. Connecting screws axially traversing an annular collar, which projects radially on spindle nut 11, are screwed into a respective, axially directed threaded hole of ring part 7. The screw heads of the connecting screws engage on the annular collar side that faces away from ring part 7 and projects radially on spindle nut 11. Intermediate ring 12 includes circumferentially, mutually spaced apart recesses into each of which a screw head projects.

Piston rod 3 is supported on the housing by a slide bearing.

The plastic sliding blocks are pin-connected to ring part 7, e.g., by hollow clamping pins, and/or are screw-connected and are guided in an axially extending longitudinal groove provided on the housing.

The housing is made of metallic housing parts 4 and 10, as well as of interposed housing part 1.

Figure 3:
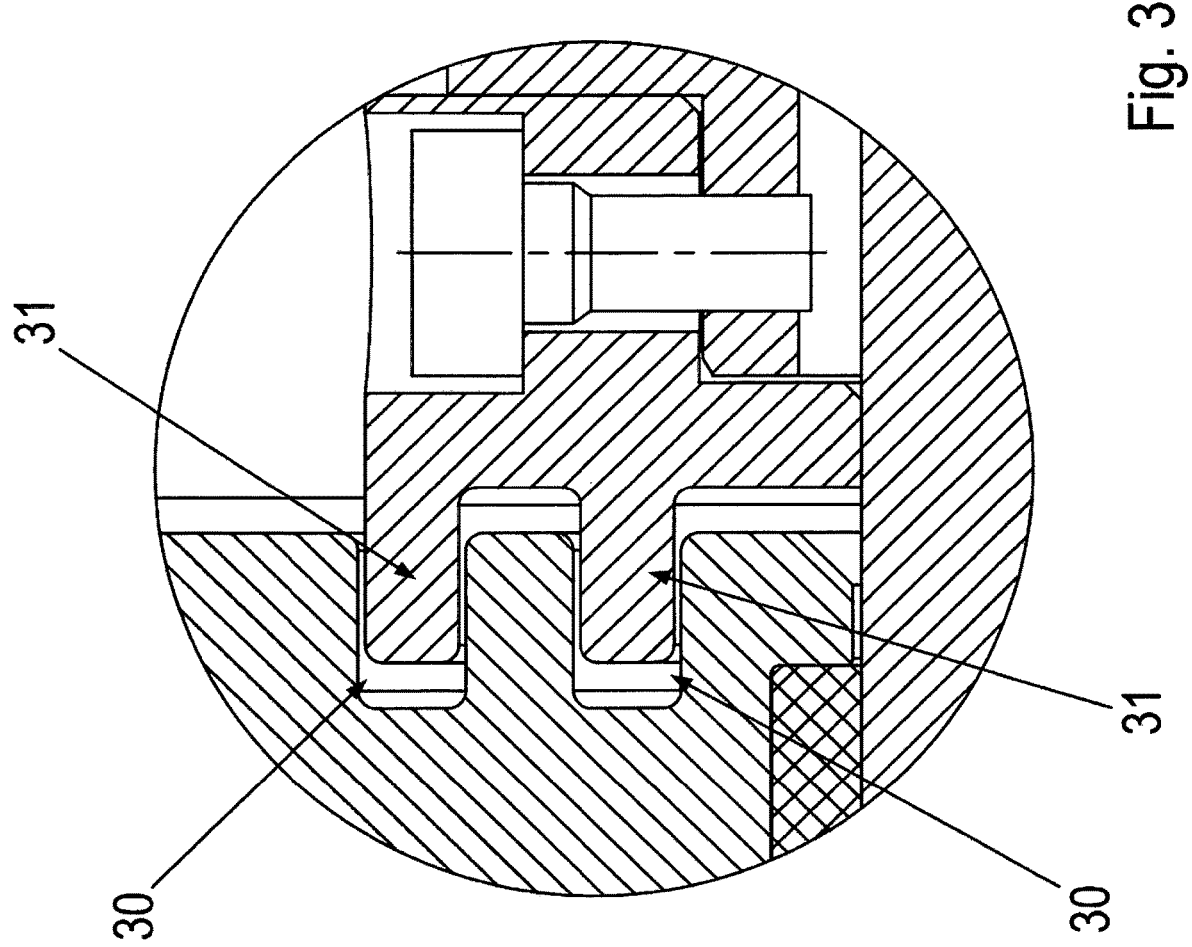
FIG. 3 shows the corresponding, enlarged detail of a spindle drive.

As shown in FIG. 3, in another exemplary embodiment according to the present invention, annular groove 6 and/or 9 are/is replaced by a concentric annular groove configuration 30. Accordingly, the annular collar formed on housing part 4 or 10 is replaced by a concentric configuration 31 of annular collars. This makes it possible to achieve an even further reinforced braking. Configurations 31 and 30 of the collars are thereby positioned to allow an annular collar of configuration 31 to enter into one of annular grooves of configuration 30.

In another exemplary embodiment according to the present invention, ring part 7 and spindle nut 11 are formed in one piece and/or in one part.

LIST OF REFERENCE NUMERALS

1 housing part
2 spindle
3 piston rod
4 housing part
5 annular collar on housing part 4
6 annular groove on ring part 7
7 ring part
8 connecting screw
9 annular groove on intermediate ring 12
10 housing part, e.g., bearing flange
11 spindle nut
12 intermediate ring
20 oil
21 air
30 concentric annular groove configuration
31 concentric configuration of annular collar
40 seal
41 scraper
42 slide bearing
43 bearing
50 recess

What is claimed is:

1. A spindle drive, comprising:
   a housing;
   a spindle; and
   a spindle nut operatively connected to the spindle;
   wherein the housing is adapted to guide the spindle nut in an axial direction of the spindle in response to rotational movement of the spindle;
   wherein, on at least one axial side, the spindle nut includes an annular groove and/or is connected to a part that includes an annular groove;
   wherein the housing includes an annular collar; and
   wherein the collar is adapted to enter and/or extend into the annular groove in response to the spindle nut reaching an associated and/or a corresponding axial position.

2. The spindle drive according to claim 1, wherein the spindle is a threaded spindle, a trapezoidal threaded spindle, a ball circulation spindle, and/or a planetary roller spindle.

3. The spindle drive according to claim 1, wherein the spindle nut is screw-connected to the part that includes the annular groove.

4. The spindle drive according to claim 1, wherein a gap is provided between the annular groove and the annular collar to allow the annular collar to enter and/or extend into the annular groove.

5. The spindle drive according to claim 1, wherein the housing surrounds an interior space, the spindle nut is located within the interior space, and the interior space is at least partially filled with oil.

6. The spindle drive according to claim 1, wherein the annular groove is formed on an intermediate ring that is:
   (a) connected; and/or
   (b) screw connected to the spindle nut; and/or
   (c) screw-connected to the spindle nut by at least one screw that radially traverses the intermediate ring and is screwed into a radially directed threaded hole of the spindle nut.

7. The spindle drive according to claim 1, wherein the housing is made of metallic housing parts.

8. A spindle drive, comprising:
   a housing;
   a spindle; and
   a spindle nut operatively connected to the spindle;
   wherein the housing is adapted to guide the spindle nut in an axial direction of the spindle in response to rotational movement of the spindle;
   wherein, on at least one axial side, the spindle nut includes an annular groove and/or is connected to a part that includes an annular groove;
   wherein the housing includes an annular collar;
   wherein the collar is adapted to enter and/or extend into the annular groove in response to the spindle nut reaching an associated and/or a corresponding axial position;
   wherein the annular groove is formed on an intermediate ring that is:

(a) connected; and/or
(b) screw connected to the spindle nut; and/or
(c) screw-connected to the spindle nut by at least one screw that radially traverses the intermediate ring and is screwed into a radially directed threaded hole of the spindle nut;

wherein a second annular groove is formed on a ring part that is screw-connected to a piston rod;

wherein the ring part includes an internal thread and the piston rod includes an external thread;

wherein a further annular collar projects radially on the spindle nut and the spindle drive further comprises connecting screws axially traversing the further annular collar;

wherein each of the connecting screws is screwed into a respective, axially-directed threaded hole of the ring part;

wherein the screw heads of the connecting screws engage on a side of the further annular collar that faces away from the ring part and projects radially on the spindle nut; and wherein the intermediate ring includes circumferentially, mutually spaced-apart recesses into each of which a screw head projects.

9. The spindle drive according to claim 8, wherein the piston rod is supported on the housing by a slide bearing.

10. A spindle drive, comprising:
a housing;
a spindle; and
a spindle nut operatively connected to the spindle;
wherein the housing is adapted to guide the spindle nut in an axial direction of the spindle in response to rotational movement of the spindle;
wherein, on each of two axial sides, the spindle nut has an annular groove or is connected to a respective part that has an annular groove;
wherein the housing includes a respective annular collar corresponding to each annular groove; and
wherein each annular collar enters and/or extends into a respective annular groove in response to the spindle nut reaching a respective, associated, and/or corresponding axial position.

11. The spindle drive according to claim 10, wherein the spindle includes a threaded spindle, a trapezoidal threaded spindle, a ball circulation spindle, and/or a planetary roller spindle.

12. The spindle drive according to claim 10, wherein, on each of the two axial sides, the spindle nut is screw-connected to the respective parts that include the annular groove.

13. The spindle drive according to claim 10, wherein a gap is provided between each of the annular grooves and the associated annular collars to allow the respective collar to enter and/or extend into the respective annular groove.

14. The spindle drive according to claim 10, wherein the housing surrounds an interior space;
wherein the spindle nut is located within the interior space and
wherein the interior space is at least partially filled with oil.

15. The spindle drive according to claim 10, wherein the annular groove is formed on an intermediate ring that is:
(a) connected; and/or
(b) screw-connected to the spindle nut; and/or
(c) screw-connected to the spindle nut by at least one screw that radially traverses the intermediate ring and is screwed into a radially directed threaded hole of the spindle nut.

16. The spindle drive according to claim 10, wherein the housing is made of metallic housing parts.

17. A spindle drive, comprising:
a housing;
a spindle; and
a spindle nut operatively connected to the spindle;
wherein the housing is adapted to guide the spindle nut in an axial direction of the spindle in response to rotational movement of the spindle;
wherein, on each of two axial sides, the spindle nut has an annular groove or is connected to a respective part that has an annular groove;
wherein the housing includes a respective annular collar corresponding to each annular groove;
wherein each annular collar enters and/or extends into a respective annular groove in response to the spindle nut reaching a respective, associated, and/or corresponding axial position;
wherein the annular groove is formed on an intermediate ring that is:
(a) connected; and/or
(b) screw-connected to the spindle nut; and/or
(c) screw-connected to the spindle nut by at least one screw that radially traverses the intermediate ring and is screwed into a radially directed threaded hole of the spindle nut;

wherein a second annular groove is formed on a ring part that is screw-connected to a piston rod;

wherein the ring part includes an internal thread and the piston rod includes an external thread;

wherein a further annular collar projects radially on the spindle nut and the spindle drive further comprises connecting screws axially traversing the further annular collar;

wherein each of the connecting screws is screwed into a respective, axially-directed threaded hole of the ring part;

wherein the screw heads of the connecting screws engage on a side of the further annular collar that faces away from the ring part and projects radially on the spindle nut; and wherein the intermediate ring includes circumferentially, mutually spaced-apart recesses into each of which a screw head projects.

18. The spindle drive according to claim 17, wherein the piston rod is supported on the housing by a slide bearing.

* * * * *